US012697576B2

(12) United States Patent
Kuo et al.

(10) Patent No.: US 12,697,576 B2
(45) Date of Patent: Aug. 4, 2026

(54) HEAT PUMP-BASED WATER HARVESTING SYSTEMS, AND METHODS OF USING THEREOF

(71) Applicant: Water Harvesting, Inc., Fremont, CA (US)

(72) Inventors: David S. Kuo, Fremont, CA (US); Ievgen Kapustin, Fremont, CA (US)

(73) Assignee: Water Harvesting, Inc., Fremont, CA (US)

( * ) Notice: Subject to any disclaimer, the term of this patent is extended or adjusted under 35 U.S.C. 154(b) by 170 days.

(21) Appl. No.: 18/601,638

(22) Filed: Mar. 11, 2024

(65) Prior Publication Data

US 2024/0252974 A1     Aug. 1, 2024

Related U.S. Application Data

(63) Continuation of application No. 18/077,417, filed on Dec. 8, 2022, now Pat. No. 12,151,199, which is a
(Continued)

(51) Int. Cl.
B01D 53/06 (2006.01)
B01D 53/04 (2006.01)
(Continued)

(52) U.S. Cl.
CPC ..... B01D 53/0438 (2013.01); B01D 53/0446 (2013.01); B01D 53/0454 (2013.01);
(Continued)

(58) Field of Classification Search
CPC ............ B01D 53/0438; B01D 53/0446; B01D 53/0454; B01D 53/06; B01D 2253/204;
(Continued)

(56) References Cited

U.S. PATENT DOCUMENTS 1,559,762 A     11/1925   Newman
4,180,985 A      1/1980   Northrup, Jr.
(Continued)

FOREIGN PATENT DOCUMENTS

CA          3120865       7/2023
CN          1312876 A     9/2001
(Continued)

OTHER PUBLICATIONS

PCT International Patent Application No. PCT/US23/33101, International Search Report and Written Opinion of the International Searching Authority dated Feb. 8, 2024, 16 pages.
(Continued)

*Primary Examiner* — Frank M Lawrence, Jr.
(74) *Attorney, Agent, or Firm* — Craig R. Miles; CR MILES P.C.

(57) ABSTRACT

Provided herein are water harvesting systems, as well as methods of making and using such systems, for capturing water from surrounding air using a design that reduces overall energy costs of the systems and improve water harvesting cycle efficiency. The systems and methods use sorbent materials, such as metal-organic frameworks, to adsorb water from the air. The systems and methods desorb this water in the form of water vapor, and the water vapor is condensed into liquid water and collected. The liquid water is suitable for use as drinking water.

15 Claims, 6 Drawing Sheets

Related U.S. Application Data continuation of application No. 17/726,996, filed on Apr. 22, 2022, now Pat. No. 11,559,762.

(60) Provisional application No. 63/180,590, filed on Apr. 27, 2021.

(51) Int. Cl.
| | |
|---|---|
| *B01D 53/26* | (2006.01) |
| *B01J 20/22* | (2006.01) |

(52) U.S. Cl.
CPC ............ *B01D 53/06* (2013.01); *B01J 20/226* (2013.01); *B01D 2253/204* (2013.01); *B01D 2257/80* (2013.01); *B01D 2259/40098* (2013.01)

(58) Field of Classification Search
CPC ...... B01D 2257/80; B01D 2259/40098; B01D 5/0006; B01D 5/0039; B01D 5/0051; B01D 5/0057; B01D 53/261; B01J 20/226; B01J 20/3433; B01J 20/3483; Y02A 20/00
USPC ..... 96/109–112, 125–127, 146, 150; 95/113, 95/117
See application file for complete search history.

(56) References Cited

U.S. PATENT DOCUMENTS

| | | | |
|---|---|---|---|
| 4,304,577 A | 12/1981 | Ito et al. | |
| 4,646,541 A | 3/1987 | Reid et al. | |
| 4,735,449 A | 4/1988 | Kuma | |
| 4,871,607 A | 10/1989 | Kuma et al. | |
| 4,886,769 A | 12/1989 | Kuma et al. | |
| 4,911,775 A | 3/1990 | Kuma et al. | |
| 5,194,414 A | 3/1993 | Kuma | |
| 5,348,922 A | 9/1994 | Kuma | |
| 5,388,423 A | 2/1995 | Khelifa | |
| 5,419,145 A | 5/1995 | Chandler et al. | |
| 5,501,007 A | 3/1996 | Kuma | |
| 5,548,905 A | 8/1996 | Kuma et al. | |
| 5,565,139 A | 10/1996 | Walker et al. | |
| 5,580,370 A | 12/1996 | Kuma et al. | |
| 5,581,907 A | 12/1996 | Kuma et al. | |
| 5,632,802 A | 5/1997 | Grgich et al. | |
| 5,632,954 A * | 5/1997 | Coellner | F28D 1/0213 422/4 |
| 5,683,532 A | 11/1997 | Kuma | |
| 5,753,345 A | 5/1998 | Kuma et al. | |
| 5,775,121 A | 7/1998 | Kuma et al. | |
| 5,779,768 A | 7/1998 | Anand et al. | |
| 6,074,972 A | 6/2000 | Bratton et al. | |
| 6,165,254 A | 12/2000 | Kawalami et al. | |
| 6,276,166 B1 | 8/2001 | Sarkisian et al. | |
| 6,328,787 B1 | 12/2001 | Yamauchi | |
| 6,334,316 B1 | 1/2002 | Maeda | |
| 6,478,855 B1 | 11/2002 | Okano | |
| D482,435 S | 11/2003 | Kawakami et al. | |
| 6,675,871 B2 | 1/2004 | Okano et al. | |
| 6,684,648 B2 | 2/2004 | Faqih | |
| 7,143,589 B2 | 12/2006 | Smith et al. | |
| 7,179,765 B2 | 2/2007 | Mueller et al. | |
| D548,823 S | 8/2007 | Matsumoto et al. | |
| 7,266,967 B2 | 9/2007 | Inoue et al. | |
| 7,753,995 B2 | 7/2010 | Okano et al. | |
| 8,500,886 B2 | 8/2013 | Okano et al. | |
| 8,627,673 B2 | 1/2014 | Hill et al. | |
| 8,734,652 B2 | 5/2014 | Kiener et al. | |
| 8,834,614 B2 | 9/2014 | Ball et al. | |
| 8,845,795 B2 | 9/2014 | Becze et al. | |
| 8,858,684 B2 | 10/2014 | Becze et al. | |
| 8,864,882 B2 | 10/2014 | Henning et al. | |
| 8,864,883 B2 | 10/2014 | Becze et al. | |
| 8,876,956 B2 | 11/2014 | Ball et al. | |
| 8,876,957 B2 | 11/2014 | Fujioka | |
| 8,882,888 B2 | 11/2014 | Ball et al. | |
| 8,882,895 B2 | 11/2014 | Ball et al. | |
| 8,920,546 B2 | 12/2014 | Ball et al. | |
| 8,984,905 B2 | 3/2015 | Okano | |
| 9,005,349 B2 | 4/2015 | Ball et al. | |
| 9,017,456 B2 | 4/2015 | Becze et al. | |
| 9,039,816 B2 | 5/2015 | Becze et al. | |
| 9,061,239 B2 | 6/2015 | Becze et al. | |
| 9,114,354 B2 | 8/2015 | Ball et al. | |
| 9,126,142 B2 | 9/2015 | Becze et al. | |
| 9,134,038 B2 | 9/2015 | Lee et al. | |
| 9,446,969 B1 | 9/2016 | Redman et al. | |
| 9,481,222 B2 | 11/2016 | Nakaya | |
| 9,617,719 B2 | 4/2017 | Sawyer et al. | |
| 9,855,524 B2 | 1/2018 | Okano | |
| 9,908,083 B2 | 3/2018 | Maruyama et al. | |
| 9,943,828 B2 | 4/2018 | Wagner et al. | |
| 9,958,205 B2 | 5/2018 | Nakahana et al. | |
| 10,087,205 B2 | 10/2018 | Yaghi et al. | |
| 10,168,057 B2 | 1/2019 | Goldsworthy et al. | |
| 10,201,776 B2 | 2/2019 | Kuroda et al. | |
| 10,266,737 B2 | 4/2019 | Van Horn et al. | |
| 10,406,475 B2 | 9/2019 | Okano | |
| 10,695,741 B2 | 6/2020 | Motkuri et al. | |
| 10,702,825 B2 | 7/2020 | Jin et al. | |
| 10,718,101 B2 | 7/2020 | Panda et al. | |
| 10,775,059 B2 | 9/2020 | Lee et al. | |
| 10,829,913 B1 | 11/2020 | Ahmed et al. | |
| 10,837,660 B2 | 11/2020 | Okano | |
| 10,850,232 B2 | 12/2020 | Nishikunibaru et al. | |
| 10,857,855 B2 | 12/2020 | Tomita et al. | |
| 10,933,371 B2 | 3/2021 | Okano | |
| 10,948,202 B2 | 3/2021 | Lee et al. | |
| 11,014,068 B2 | 5/2021 | Yaghi et al. | |
| 11,029,045 B2 | 6/2021 | Woods et al. | |
| 11,058,988 B2 | 7/2021 | Okano | |
| 11,059,838 B2 | 7/2021 | Yaghi et al. | |
| 11,065,573 B2 | 7/2021 | Matuska et al. | |
| 11,179,669 B2 | 11/2021 | Inoue et al. | |
| 11,181,294 B2 | 11/2021 | Nobutaka | |
| 11,224,856 B2 | 1/2022 | Chang et al. | |
| 11,358,097 B2 | 6/2022 | Okano | |
| 11,446,605 B2 | 9/2022 | Besarati et al. | |
| 11,559,762 B1 | 1/2023 | Kuo et al. | |
| 11,559,765 B2 | 1/2023 | Ball et al. | |
| 11,623,178 B2 | 4/2023 | Ball et al. | |
| 11,679,339 B2 | 6/2023 | Van de Mortel | |
| 11,701,638 B2 | 7/2023 | Yaghi et al. | |
| 11,703,236 B2 | 7/2023 | Ball et al. | |
| 11,794,144 B2 | 10/2023 | Okano | |
| 12,000,122 B2 | 6/2024 | Yaghi et al. | |
| 12,023,625 B2 | 7/2024 | Inoue | |
| 12,054,922 B2 | 8/2024 | Kuo et al. | |
| 12,151,199 B2 | 11/2024 | Kuo et al. | |
| 12,247,759 B2 | 3/2025 | Ge et al. | |
| 12,390,760 B2 | 8/2025 | Smith et al. | |
| 2001/0010261 A1 | 8/2001 | Oomura et al. | |
| 2002/0040575 A1 | 4/2002 | Okano et al. | |
| 2004/0040172 A1 | 3/2004 | Crawford | |
| 2004/0107832 A1 | 6/2004 | Tongue et al. | |
| 2004/0123615 A1 | 7/2004 | Yabu | |
| 2004/0123616 A1 | 7/2004 | Lee et al. | |
| 2004/0244398 A1 | 12/2004 | Radermacher et al. | |
| 2005/0044862 A1 | 3/2005 | Vetrovec et al. | |
| 2005/0172805 A1 | 8/2005 | Motono et al. | |
| 2006/0042464 A1 | 3/2006 | Fujoka | |
| 2006/0130652 A1 | 6/2006 | Takewaki et al. | |
| 2006/0156750 A1 | 7/2006 | Lowenstein et al. | |
| 2007/0028769 A1 | 2/2007 | Eplee et al. | |
| 2008/0168789 A1 | 7/2008 | Jones et al. | |
| 2009/0139254 A1 | 6/2009 | Landry | |
| 2009/0151368 A1 | 6/2009 | Bar | |
| 2009/0260385 A1 | 10/2009 | Hill et al. | |
| 2010/0126344 A1 | 5/2010 | Stein et al. | |
| 2010/0175557 A1 | 7/2010 | Shih et al. | |
| 2010/0286830 A1 | 11/2010 | Wijaya et al. | |
| 2010/0319371 A1 | 12/2010 | Bellemo | |

(56) References Cited

U.S. PATENT DOCUMENTS

| | | |
|---|---|---|
| 2010/0324742 A1 | 12/2010 | Huerta-Ochoa |
| 2011/0017061 A1 | 1/2011 | Carlsson |
| 2011/0056220 A1 | 3/2011 | Caggiano |
| 2011/0088552 A1 | 4/2011 | Ike et al. |
| 2011/0296858 A1 | 12/2011 | Caggiano |
| 2012/0172612 A1 | 7/2012 | Yaghi et al. |
| 2013/0036913 A1 | 2/2013 | Fukudome |
| 2013/0061752 A1 | 3/2013 | Farha et al. |
| 2013/0192281 A1 | 8/2013 | Nam et al. |
| 2013/0269522 A1 | 10/2013 | DeValve |
| 2013/0312451 A1 | 11/2013 | Max |
| 2013/0319245 A1 | 12/2013 | Ball et al. |
| 2013/0319250 A1 | 12/2013 | Becze et al. |
| 2014/0138236 A1 | 5/2014 | White |
| 2014/0165637 A1 | 6/2014 | Ma |
| 2014/0260967 A1 | 9/2014 | Gitschlag |
| 2014/0287150 A1 | 9/2014 | Miljkovic et al. |
| 2014/0326133 A1 | 11/2014 | Wang et al. |
| 2014/0338425 A1 | 11/2014 | Kalbassi et al. |
| 2016/0030858 A1 | 2/2016 | Giacomini |
| 2016/0084541 A1 | 3/2016 | Aguado et al. |
| 2016/0334145 A1 | 11/2016 | Pahwa et al. |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0211851 A1 | 7/2017 | Feng et al. |
| 2017/0234576 A1 | 8/2017 | Kawagoe et al. |
| 2017/0292737 A1 | 10/2017 | Moon |
| 2017/0354920 A1 | 12/2017 | Switzer et al. |
| 2018/0030695 A1 | 2/2018 | Ng |
| 2018/0043295 A1* | 2/2018 | Friesen .................. B01D 53/14 |
| 2018/0171604 A1 | 6/2018 | Kim et al. |
| 2018/0209123 A1 | 7/2018 | Bahrami et al. |
| 2018/0261882 A1 | 9/2018 | Chang et al. |
| 2018/0311609 A1 | 11/2018 | McCool et al. |
| 2019/0100903 A1 | 4/2019 | Panda et al. |
| 2019/0234053 A1 | 8/2019 | Kim et al. |
| 2019/0242097 A1 | 8/2019 | Rockenfeller et al. |
| 2019/0285290 A1 | 9/2019 | Woods et al. |
| 2019/0323714 A1 | 10/2019 | Cui |
| 2020/0009497 A1* | 1/2020 | Matuska .............. B01D 53/261 |
| 2020/0147587 A1 | 5/2020 | Yaghi et al. |
| 2020/0182734 A1 | 6/2020 | Ueno et al. |
| 2020/0206679 A1 | 7/2020 | Stuckenberg |
| 2020/0283997 A1 | 9/2020 | Salloum et al. |
| 2020/0316514 A1 | 10/2020 | Fuchs et al. |
| 2020/0361965 A1* | 11/2020 | Yaghi ........................ C02F 1/14 |
| 2020/0363078 A1 | 11/2020 | Mulet et al. |
| 2021/0062478 A1 | 3/2021 | Friesen et al. |
| 2021/0156124 A1 | 5/2021 | Yaghi et al. |
| 2021/0237535 A1 | 8/2021 | Goel et al. |
| 2021/0283528 A1 | 9/2021 | Pokorny et al. |
| 2021/0283574 A1 | 9/2021 | Yaghi et al. |
| 2021/0285189 A1 | 9/2021 | Pokorny et al. |
| 2021/0394114 A1 | 12/2021 | Schmaelzle et al. |
| 2022/0001328 A1 | 1/2022 | Yoon et al. |
| 2022/0106203 A1 | 4/2022 | Marchon et al. |
| 2022/0170247 A1 | 6/2022 | Yaghi et al. |
| 2022/0349158 A1 | 11/2022 | Kapustin et al. |
| 2022/0389691 A1 | 12/2022 | Kuo et al. |
| 2023/0063572 A1 | 3/2023 | Kapustin |
| 2023/0228066 A1 | 7/2023 | Perkin |
| 2023/0264138 A1 | 8/2023 | McGrail et al. |
| 2025/0153097 A1 | 5/2025 | Stuckenberg |
| 2025/0314389 A1 | 10/2025 | Inoue et al. |

FOREIGN PATENT DOCUMENTS

| | | | |
|---|---|---|---|
| CN | 102639540 A | 8/2012 | |
| CN | 102949913 | 3/2013 | |
| CN | 104813107 A | 7/2015 | |
| CN | 106029674 A | 10/2016 | |
| CN | 205718197 | 11/2016 | |
| CN | 104813107 | 8/2017 | |
| CN | 1077722290 A | 2/2018 | |
| CN | 111565817 A | 8/2020 | |
| CN | 111902195 A | 11/2020 | |
| CN | 114182784 A | 3/2022 | |
| CN | 115364622 A | 11/2022 | |
| CZ | 2018-337 | 7/2019 | |
| EP | 0492879 A1 | 7/1992 | |
| EP | 0816225 A1 | 1/1998 | |
| EP | 2507247 A1 | 10/2012 | |
| EP | 2609982 B1 | 3/2016 | |
| EP | 3639906 A1 | 4/2020 | |
| EP | 3721971 | 10/2020 | |
| EP | 3878541 A1 | 9/2021 | |
| FR | 3026027 A1 | 3/2016 | |
| GB | 2540798 A | 2/2017 | |
| JP | S63-107720 A | 5/1988 | |
| JP | 2003184137 A | 7/2003 | |
| JP | 2006-308246 | 11/2006 | |
| JP | 2009-178711 | 8/2009 | |
| JP | 2009-292318 A | 12/2009 | |
| JP | 4688561 B2 | 5/2011 | |
| JP | 2013-512223 A | 4/2013 | |
| JP | 2017-509607 A | 4/2017 | |
| JP | 2018080146 A | 5/2018 | |
| SE | 462671 B | 8/1990 | |
| WO | WO 02/088148 A1 | 11/2002 | |
| WO | WO 03/035717 A1 | 5/2003 | |
| WO | WO 03/064030 A1 | 8/2003 | |
| WO | WO 03/097216 A1 | 11/2003 | |
| WO | WO 2023/225432 A1 | 11/2003 | |
| WO | WO 03/101975 A1 | 12/2003 | |
| WO | WO 03/102000 A1 | 12/2003 | |
| WO | WO 2004/037895 A1 | 5/2004 | |
| WO | WO 2004/101575 A2 | 11/2004 | |
| WO | WO 2005/003069 A2 | 1/2005 | |
| WO | WO 2005/003622 A1 | 1/2005 | |
| WO | WO 2006/028479 A1 | 3/2006 | |
| WO | WO 2006/050898 A1 | 5/2006 | |
| WO | WO 2006/089908 | 8/2006 | |
| WO | WO 2006/110740 A2 | 10/2006 | |
| WO | WO 2007/038508 A2 | 4/2007 | |
| WO | WO 2007/101241 A2 | 9/2007 | |
| WO | WO 2008/091976 A1 | 7/2008 | |
| WO | WO 2008/140788 A1 | 11/2008 | |
| WO | WO 2009/020745 A2 | 2/2009 | |
| WO | WO 2009/042802 A1 | 4/2009 | |
| WO | WO 2009/149381 A3 | 12/2009 | |
| WO | WO 2010/078337 A1 | 7/2010 | |
| WO | WO 2010/080618 A2 | 7/2010 | |
| WO | WO 2010/088629 A1 | 8/2010 | |
| WO | WO 2010/090683 A1 | 8/2010 | |
| WO | WO 2010/148276 A2 | 12/2010 | |
| WO | WO 2010/148296 A2 | 12/2010 | |
| WO | WO 2010/148374 A2 | 12/2010 | |
| WO | WO 2011/014503 A1 | 2/2011 | |
| WO | WO 2011/146155 A2 | 11/2011 | |
| WO | WO 2012/012495 A2 | 1/2012 | |
| WO | WO 2012013596 A1 | 2/2012 | |
| WO | WO 2012/100224 A2 | 7/2012 | |
| WO | WO 2012/106451 A2 | 8/2012 | |
| WO | WO 2013/112212 A2 | 8/2013 | |
| WO | WO 2015/127033 A1 | 8/2015 | |
| WO | WO 2015/142944 A2 | 9/2015 | |
| WO | WO 2015/142954 A1 | 9/2015 | |
| WO | WO 2015/157239 A1 | 10/2015 | |
| WO | WO 2015/161037 A1 | 10/2015 | |
| WO | WO 2015/195179 A3 | 12/2015 | |
| WO | WO2016/186454 A1 | 11/2016 | |
| WO | WO 2016/189958 A1 | 12/2016 | |
| WO | WO 2017/091779 A1 | 6/2017 | |
| WO | WO 2017/091814 A1 | 6/2017 | |
| WO | WO 2018/031599 A1 | 2/2018 | |
| WO | WO 2018/118377 A1 | 6/2018 | |
| WO | WO 2018/222785 A1 | 12/2018 | |
| WO | WO 2018/230430 A1 | 12/2018 | |
| WO | WO 2019/010102 A1 | 1/2019 | |
| WO | WO 2019/046404 A1 | 3/2019 | |
| WO | WO 2019/058158 A1 | 3/2019 | |
| WO | WO 2019/082000 A1 | 5/2019 | |
| WO | WO 2019/152962 A2 | 8/2019 | |

(56) References Cited

FOREIGN PATENT DOCUMENTS

| | | |
|---|---|---|
| WO | WO 2020/036905 A1 | 2/2020 |
| WO | WO 2020/060887 A9 | 3/2020 |
| WO | WO 2020/099561 A1 | 5/2020 |
| WO | WO 2020/112899 | 6/2020 |
| WO | WO 2020/112899 A1 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/086637 A1 | 5/2021 |
| WO | WO 2021/086638 A1 | 5/2021 |
| WO | WO 2021/086639 A1 | 5/2021 |
| WO | WO 2021/142474 A1 | 7/2021 |
| WO | WO 2021/154629 A1 | 8/2021 |
| WO | WO 2021/162894 A1 | 8/2021 |
| WO | WO 2022/240659 A1 | 11/2022 |
| WO | WO 2023/018601 A1 | 2/2023 |
| WO | WO 2023/146800 A1 | 8/2023 |
| WO | WO 2023/181058 A1 | 9/2023 |
| WO | WO 2023/196122 A1 | 10/2023 |
| WO | WO 2023/220514 A1 | 11/2023 |
| WO | WO 2024/167697 A1 | 8/2024 |
| WO | WO 2024/191551 A3 | 9/2024 |
| WO | WO 2025/075958 A1 | 4/2025 |
| WO | WO 2025/076465 A1 | 4/2025 |

OTHER PUBLICATIONS

U.S. Appl. No. 17/763,413, Office Action mailed Feb. 6, 2024.
U.S. Appl. No. 18/077,417, Office Action mailed Mar. 29, 2024.
U.S. Appl. No. 18/371,700, Office Action mailed Apr. 18, 2024.
European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.
PCT International Patent Application No. PCT/US22/41142, International Search Report and Written Opinion of the International Searching Authority dated Jan. 20, 2023, 12 pages.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
Japanese Patent Application No. 2021-529709, Office Action dated Nov. 21, 2023, 6 pages.
PCT International Patent Application No. PCT/IN23/50258, International Search Report and Written Opinion of the International Searching Authority dated Jul. 4, 2023, 10 pages.
U.S. Appl. No. 18/384,992, Office Action mailed Jan. 23, 2024.
U.S. Appl. No. 18/077,417, Office Action mailed Jan. 17, 2024.
Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.

Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
Canivet et al. Water adsorption in MOFs: fundamentals and applications. Chem. Soc. Rev., Aug. 2014, 43(16):5594-5617.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
Gleick. Water in Crisis: A Guide to the World's Fresh Water Resources. Chapter 2, pp. 13-24. Aug. 1993, Oxford University Press, New York, USA.
PCT International Patent Application No. PCT/US22/26153, International Search Report and Written Opinion of the International Searching Authority dated Jul. 28, 2022, 18 pages.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
Ding et al. Carbon capture and conversion using metal-organic frameworks and MOF-based materials. Chem. Soc. Rev., May 2019, 48(2):2783-2828.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal-Organic Frameworks and Related Materials. J. Am. Chem. Soc., Mar. 2014, 136, 11, 4369-4381.
Hanikel et al. Rapid Cycling and Exceptional Yield in a Metal-Organic Frameworks for Water Harvester. ACS Cent. Sci., Aug. 2019, 5(10):1699-1706.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for CO2 Capture. ChemSusChem., Oct. 2016, 9(19):2832-2840.
R. Sonntag and C. V. Wylen. Introduction to Thermodynamics: Classical and Statistical, 2nd ed., John Wylie and Sons, Inc., 1982.
Tu et al. Progress and Expectation of Atmospheric Water Harvesting. Joule, Aug. 2018, 2(8):1452-1478.

(56)             References Cited

OTHER PUBLICATIONS

Zhou et al. Atmospheric Water Harvesting: A Review of Material and Structural Designs. ACS Materials Lett., May 2020, 2(7):671-684.
Falkenstein-Smith et al. Investigation of oxygen transport membrane reactors for oxy-fuel combustion and carbon capture purposes. Proceedings of the Combustion Institute, Feb. 2017, 36(3):3969-3976.
Liao et al. Putting an ultrahigh concentration of amine groups into a metal-organic framework for CO2 capture at low pressures. Chem. Sci., Oct. 2016, 7(10):6528-6533.
U.S. Appl. No. 18/022,094, Office Action mailed Jun. 30, 2025.
U.S. Appl. No. 17/797,969, Office Action mailed Jan. 30, 2025.
U.S. Appl. No. 17/881,915, Office Action mailed Feb. 12, 2025.
U.S. Appl. No. 17/951,956, Office Action mailed Mar. 27, 2025.
U.S. Appl. No. 17/963,360, Office Action mailed Apr. 1, 2025.
U.S. Appl. No. 18/098,879, Office Action mailed May 7, 2025.
U.S. Appl. No. 18/380,111, Office Action mailed Nov. 3, 2025.
Australian Patent Application No. 2021219610, Examination Report No. 1 dated Dec. 17, 2025, 3 pages.
Australian Patent Application No. 2023347171, Examination Report No. 1 dated Apr. 15, 2025, 4 pages.
Brazilian Patent Application No. BR1120230210399, Office Action published Jun. 3, 2025, 6 pages.
Canadian Patent Application No. 3,167,734, Office Action dated Aug. 13, 2025, 12 pages.
Chinese Patent Application No. 202380066924.9, Official Action issued Nov. 15, 2025, 7 pages.
European Patent Application No. 22796488.9, Extended European Search Report dated Feb. 19, 2025. 9 pages.
European Patent Application No. 23868851.9, Extended European Search Report dated Nov. 17, 2025, 4 pages.

Israeli Patent Application No. 319527, Notice of Deficiencies dated Jun. 5, 2025, 5 pages.
Japanese Patent Application No. 2022-548907, Official Action dated Dec. 23, 2024, 7 pages (with English translation).
Japanese Patent Application No. 2023-565367, Official Action mailed Oct. 7, 2025, 10 pages (with English translation).
Korean Patent Application No. 10-2025-7009326, Notification of Provisional Rejection dated July 2. 2025. 4 pages.
Mexican Patent Application No. MX/a/2022/009826, Official Action dated Nov. 19, 2025, 4 pages.
Mexican Patent Application No. MX/a/2022/009826, Official Action dated Jan. 9, 2026, 5 pages.
Mexican Patent Application No. MX/a/2022/010641, Official Action dated Sep. 25, 2025, 4 pages.
Saudi Arabian Patent Application No. 523451277, Substantive Examination Report published Jul. 27, 2025, 7 pages.
Singapore Patent Application No. 11202251782X, Official Action dated Apr. 17, 2026, 10 pages.
Taiwan Patent Application No. 111102180, Official Action and Search Report dated Mar. 11, 2025, 9 pages (with English translation).
Taiwan Patent Application No. 114130909, Official Letter from TIPO dated Nov. 3, 2025, 8 pages (with English translation).
United Arab Emirates Patent Application No. P6000772/22, Office Action dated Jul. 10, 2024, 10 pages.
United Arab Emirates Patent Application No. P6000774/22, Office Action dated Jul. 10, 2024, 8 pages.
United Arab Emirates Patent Application No. P6000775/22, Office Action dated Jul. 10, 2024, 7 pages.
United Arab Emirates Patent Application No. P6002794/2023. Office Action dated Apr. 30, 2025. 7 pages.
Mexican Patent Application No. MX/a/2025/003320, Office Action dated Jan. 15, 2026, 6 pages.

* cited by examiner

HEAT PUMP-BASED WATER HARVESTING SYSTEMS, AND METHODS OF USING THEREOF

This United States Non-Provisional Patent Application claims the benefit of U.S. Provisional Patent Application No. 63/180,590, filed Apr. 27, 2021, hereby incorporated by reference herein.

FIELD

The present disclosure generally relates to water harvesting, and more specifically to a water harvester, and methods of making a water harvester and methods of using a water harvester for harvesting water from surrounding air.

BACKGROUND

Conventionally, the process of harvesting water from air with sorbents comprises a water harvesting cycle including three energy-intensive stages: adsorption of water vapor from air to a sorbent, desorption of water vapor from the sorbent, and condensation of desorbed water vapor into liquid water. For example, during the adsorption stage, humid environmental air may be blown across a desorbed (activated) sorbent bed. Molecules of water can diffuse through the porous interior of the sorbent bed and become adsorbed by the sorbent. The adsorption stage is completed when the sorbent bed becomes fully saturated with water. Following the adsorption stage, a desorption stage can be initiated by directly or indirectly heating up the sorbent bed to release water vapor. The desorption stage is completed when the sorbent bed becomes desaturated of water. During the condensation stage, water vapor generated during the desorption stage can be directed to a condensation chamber, where the water vapor cools and condenses into liquid water. Through repetitive cycles of adsorption, desorption and condensation, sorbent-based water harvesting can provide a method to produce water from air.

Generally, there are two heating methods to release water from the saturated sorbent bed: first, direct heating that involves heat transfer from a heat source directly to the surface of the sorbent bed support structure, the sorbent bed, or the sorbent; and second, an indirect heating that involves heating the air surrounding the sorbent bed support structure, the sorbent bed, or the sorbent. Both direct heating and indirect heating can be achieved with resistive heating. Desorption typically requires significant energy, including a latent heat portion related to the desorption energy to change water associated with the sorbent to water vapor, and a sensible energy portion related to heating one or more of the sorbent bed support structure, the sorbent bed, or the sorbent. Potentially, the energy spent on desorption can be recovered during the condensation stage and then reintroduced into the system for desorption. Generally, resistive heating does not provide for recovery of energy spent on desorption.

What is desired in the art are commercially viable water harvesting systems for harvesting water from surrounding air that by comparison to conventional water harvesting systems reduces energy costs and/or improves efficiency in water production during the water harvesting cycle.

BRIEF SUMMARY

Provided herein are heat pump-based water harvesting systems that can reduce overall energy costs in the water harvesting cycle and/or improves efficiency in water production during the water harvesting cycle.

A broad object of embodiments of the invention can be to provide an atmospheric water harvesting system, comprising one or more of: a heat-pump system; an adsorption unit; a desorption chamber; a transfer mechanism; and a condensation chamber. In particular embodiments, the heat-pump system can comprise one or more of: a compressor, an expansion valve, and a heat exchanger, wherein the heat exchanger has a hot side (typically a "condenser") and a cold side (typically an "evaporator"). In particular embodiments, the adsorption unit comprises at least one sorbent module, wherein the at least sorbent module contains one or more sorbents, and the adsorption unit can, but need not necessarily, be physically separated from the heat-pump system. In some embodiments, the desorption chamber can be connected to or positioned in close proximity to the hot side of the heat exchanger, and can be configured to operate at an average desorption temperature. In particular embodiments, the transfer mechanism can be configured to (i) transfer a sorbent module at least partially saturated with water from the adsorption unit into the desorption chamber, and (ii) transfer the sorbent module at least partially desorbed in the desorption chamber back to the adsorption unit. In particular embodiments, the condensation chamber can encompass or be positioned in close proximity to the cold side of the heat exchanger, and can be configured to operate at an average condensation temperature. In particular variations of the foregoing, the water harvesting system can be configured to operate at an average desorption temperature and the average condensation temperature for the system to (i) achieve the lowest energy per liter of water produced with the one or more sorbents, or (ii) maintain a desorption temperature high enough to sustain a target rate of desorption, and combinations thereof.

Another broad object of the invention can be a method of harvesting water from surrounding air, including using any one or combinations of the atmospheric water harvesting systems described herein. In particular embodiments, the method comprises: a) drawing surrounding air into at least one sorbent module which may be positioned in the adsorption unit, wherein the at least one sorbent module adsorbs water from the surrounding air; b) once the at least one sorbent module becomes at least partially saturated or saturated to a target level of water and/or rate of adsorption, transferring the at least one sorbent module to the desorption chamber, which may achieved using the transfer mechanism to move the sorbent module from the adsorption unit to the desorption chamber; c) blowing air or an air/water mixture across the hot side of the heat pump through the at least one sorbent module positioned in the desorption chamber to facilitate water desorption; d) transferring hot water vapor from the desorption chamber to the cold side of the heat pump, which may be coordinated with the desorption chamber achieving a target water concentration; e) optionally repeating steps c) and d) until the at least one sorbent module in the desorption chamber becomes depleted of adsorbed water; and f) transferring the at least one sorbent module from the desorption chamber after desorption, which may be coordinated using the transfer mechanism to move the sorbent module from the desorption chamber to the adsorption unit. In particular variations of the foregoing, the method can be performed at an average desorption temperature or the average condensation temperature for the water harvesting system, or combinations thereof, to (i) achieve the lowest energy per liter of water produced with the one or more sorbents, or (ii) maintain a desorption temperature high enough to sustain a target rate of desorption, and combinations thereof.

DESCRIPTION OF THE FIGURES

The present application can be best understood by reference to the following description taken in conjunction with the accompanying figures included in the specification.

DETAILED DESCRIPTION

Figure 1:
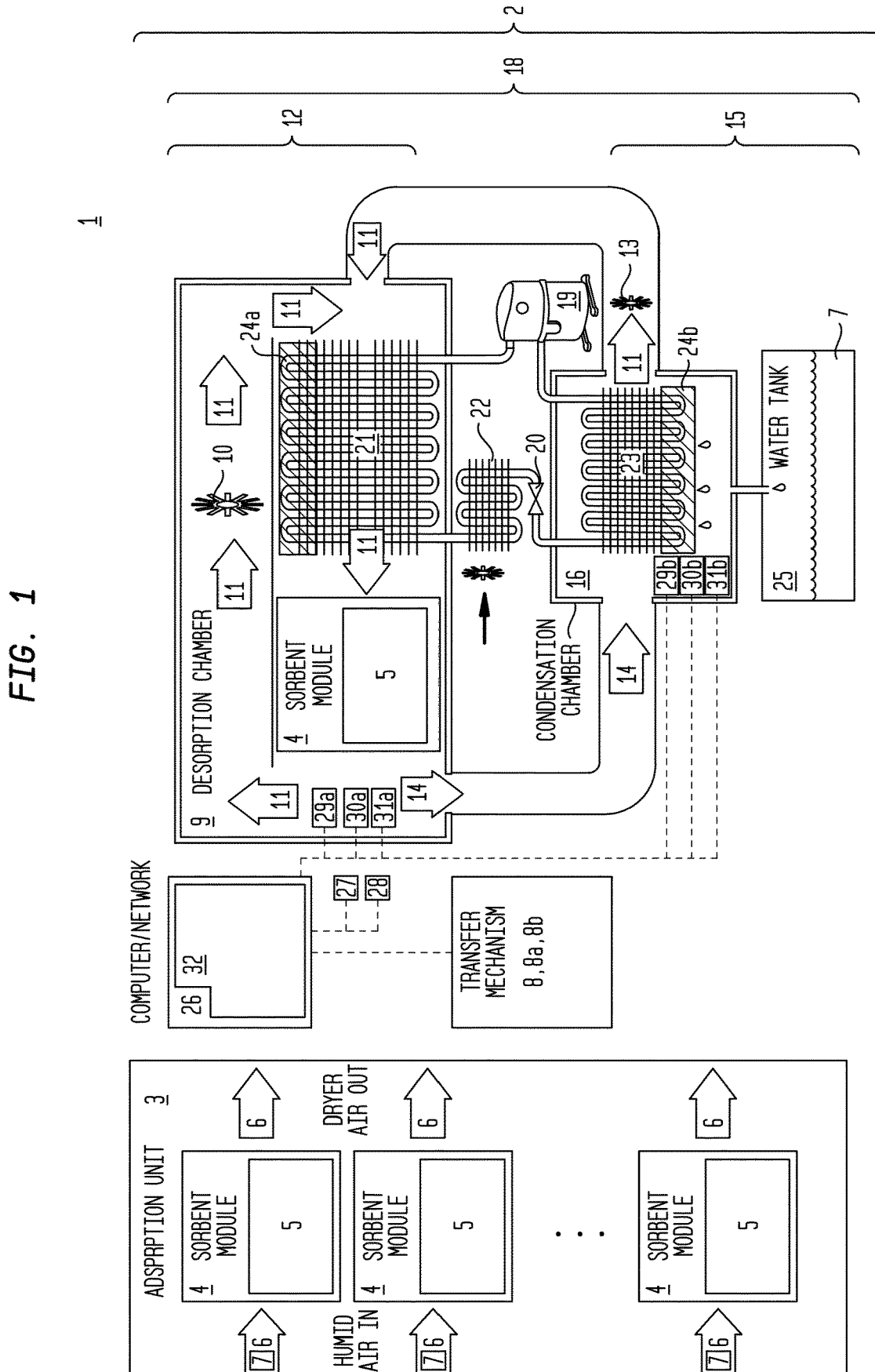
FIG. 1 depicts a schematic of an exemplary heat pump-based water harvesting system.

The following description sets forth illustrative examples of heat pump-based water harvesting systems (1), methods of making heat pump-based water harvesting systems (also referred to as the "system"), and methods of using heat pump-based water harvesting systems. It should be recognized, however, that the examples of heat pump-based water harvesting system (1) provided by the description are not intended to limit the breadth or scope of the description, but instead to provide examples sufficient for a person of ordinary skill in the art to make and use the full breadth and scope of the invention.

Now with primary reference to FIGS. 1 through 5, provided is a sorbent-based water harvesting system (1) including a heat pump (2) to effectively recover condensation energy and use it for desorption. In certain aspects, provided is a method of using any of the sorbent-based water harvesting systems (1) described herein. In some embodiments, the system (1) includes an adsorption unit (3), such as an adsorption rack, that that holds one or more sorbent modules (4) containing at least one sorbent material (5). Air (6) can flow across one or more sorbent modules (4), leading to adsorption of water (7) from the surrounding air (6) by the sorbent material (5) therein. The system (1) includes a transfer mechanism (8), which in particular embodiments can be a carousel (8a) (as shown in the example of FIG. 2A) or can be a robotic arm (8b) (as shown in the example of FIG. 2B). Once one or more of the sorbent modules (4) reach a target level and/or a target rate of adsorption, the transfer mechanism (8) can move the one or more sorbent modules (4) containing adsorbed water from the adsorption unit (3) to a desorption chamber (9) of the system (1). In some embodiments, the desorption chamber (9) includes a recirculation fan (10) that blows air or an air/water mixture (11) across a hot side (12) of the heat pump (2) through the one or more sorbent modules (4) to facilitate desorption. Once a target water concentration is achieved in the desorption chamber (9), in particular embodiments, the system (1) can turn on a desorption-condenser recirculation fan (13) present in the desorption chamber (9) to transfer hot water vapor (14) from the desorption chamber (9) to a cold side (15) of the heat pump (2) encompassed in, or positioned in closer proximity to, a condensation chamber (16). In some variations, the optimal average desorption temperature and/or average condensation temperature for the system (1) can be configured to achieve the lowest energy per liter of water (7) produced with the sorbent material (5) and can keep the desorption temperature high enough to sustain a target desorption rate. Upon depletion of the sorbent module (4), the transfer mechanism (8) can remove the one or more sorbent modules (4) from the desorption chamber (9) and places the one or more sorbent modules (4) back into the adsorption unit (3). Embodiments of the sorbent-based water harvesting system (1) can achieve increased water adsorption, as well as continuous desorption and condensation at elevated temperatures.

Figure 2A:
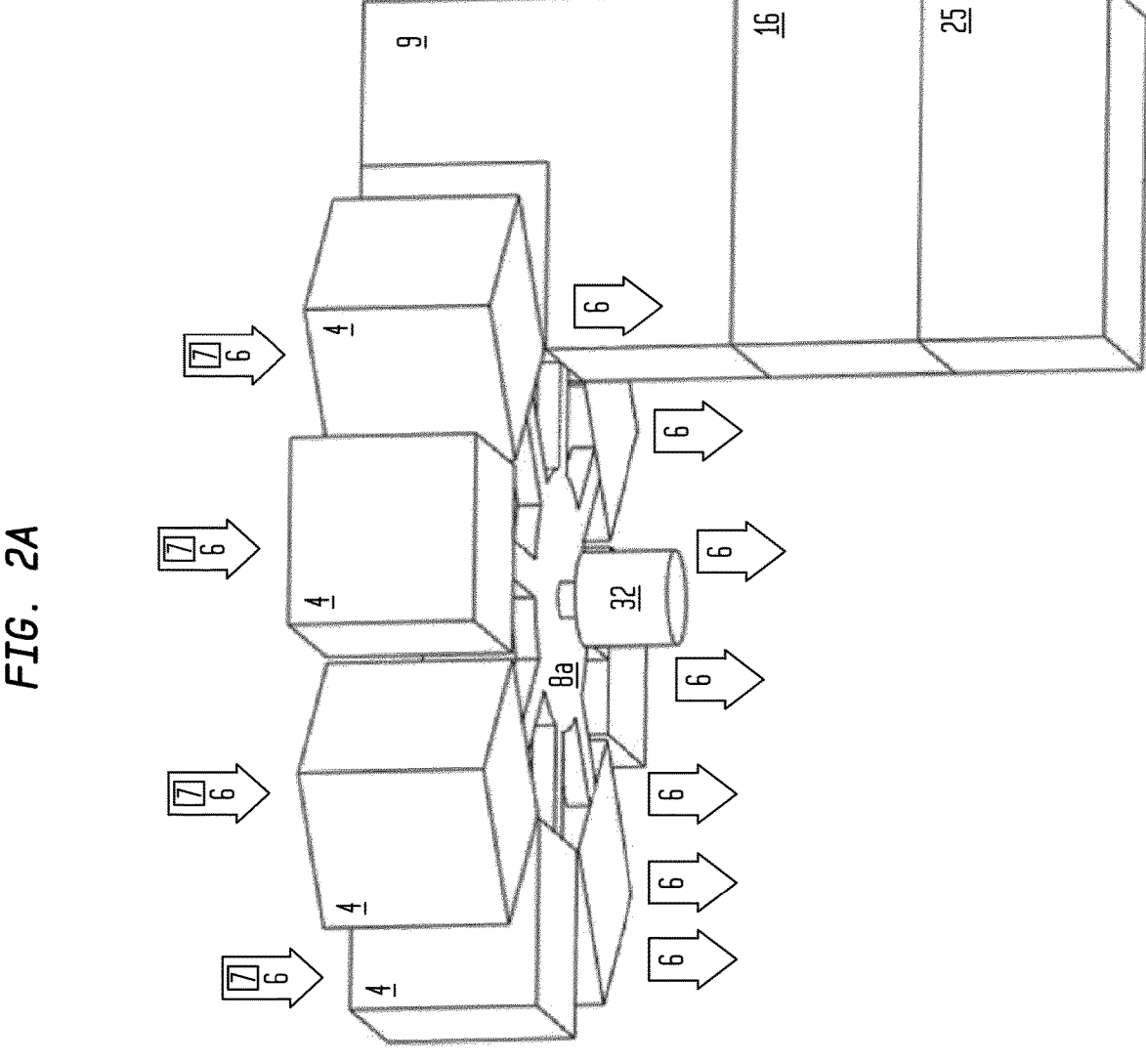
FIG. 2A depicts an exemplary heat pump-based water harvesting system that includes a rotating carousel configured to continuously move fully saturated MOF modules into the desorption chamber of the desorption/condensation unit for desorption.
Figure 2B:
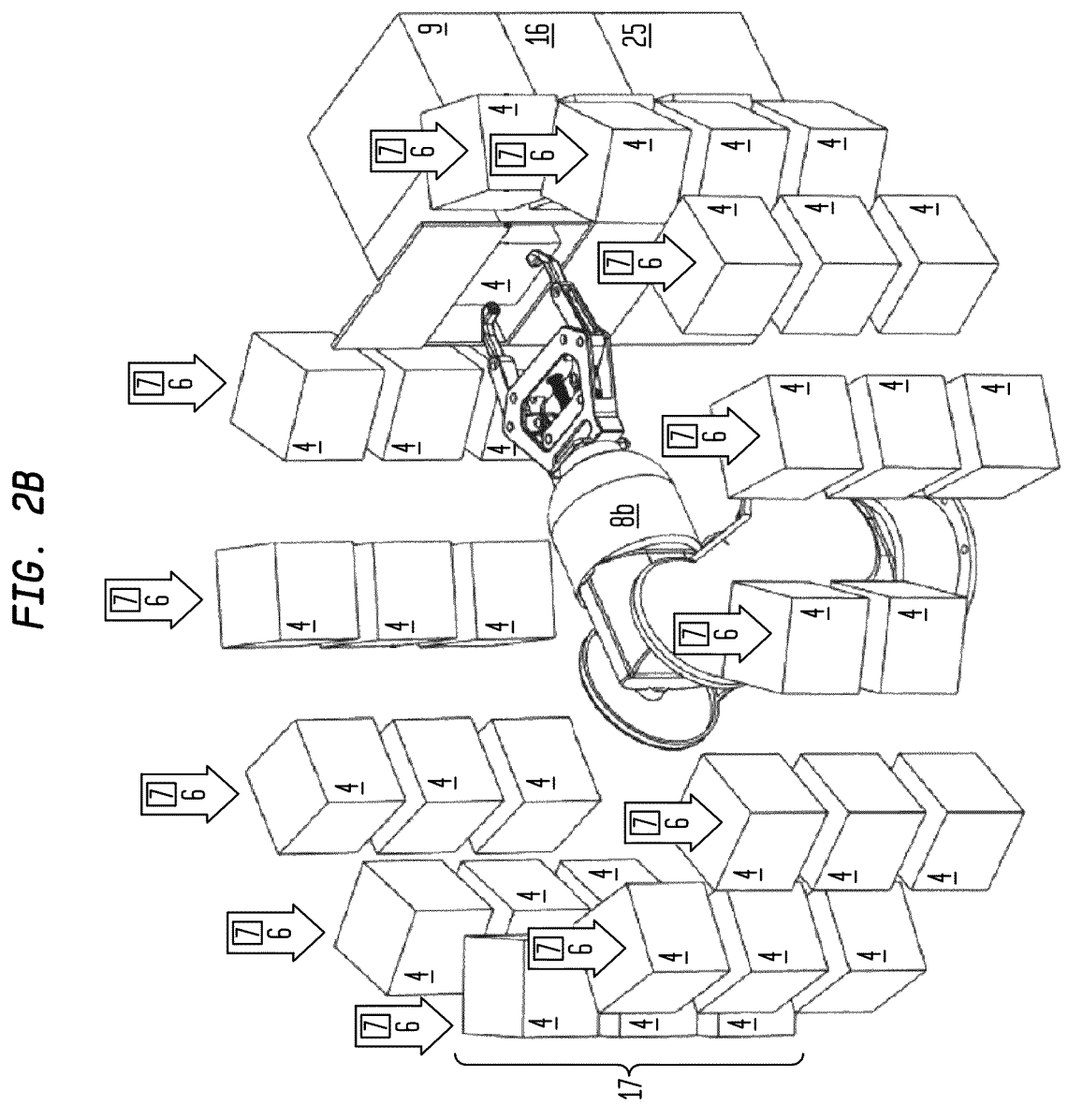
FIG. 2B depicts another exemplary heat pump-based water harvesting system that includes a multi-axis robotic arm configured to switch the MOF modules between the adsorption rack and the desorption chamber.

In particular embodiments, as depicted in FIG. 2A, the example system (1) utilizes a carousel (8a) which rotates one or more sorbent module(s) (4). While one or more sorbent modules (4) are being desorbed, the remaining sorbent modules (4) can be in the adsorption stage being exposed to humid environmental air (6). In particular embodiments, as depicted in FIG. 2B, utilized a robotic arm (8b) to transfer the one or more sorbent modules (4) from an adsorption rack (17) to the desorption chamber (9). Again, with reference to FIG. 1, in particular embodiments, the heat-pump (2) includes a heat exchanger (18), which has a hot side (12) and a cold side (15). In some variations, the heat-pump (2) may include a compressor (19), an expansion valve (20), a main "condenser" or hot-side heat exchanger (21), a secondary hot-side heat exchanger (22), an "evaporator" or cold-side heat exchanger (23), and other control components designed to operate at elevated temperatures. For example, in particular embodiments, the "condenser" or hot side of the heat exchanger (21) can be set to operate at temperatures in the range of about 90° C. to about 160° C., and the "evaporator" or cold-side heat exchanger (23) can be set to operate at temperatures in the range of about 40° C. to about 95° C.

Again, with reference to FIG. 1, the "condenser" or hot side of the heat exchanger (21) in the desorption chamber (9) and the "evaporator" or cold-side heat exchanger (23) in the condensation chamber (16) can be respectively coupled to a heat sink(s) (24a, 24b) to provide substantially constant or constant temperature operation when the sorbent modules (4) move in and out of the desorption chamber (9). The heat sink(s) (24a, 24b) can be a metal block or any other material of high thermal mass in both the desorption chamber (9) and condensation chambers (16). It can also be liquid water (7) in the condensation chamber (16).

The performance of a heat pump (2) in the system (1) can generally be modelled by the following equations:

$$W = \frac{Q_c}{COP} \tag{1}$$

and $$COP = f \frac{T_c}{T_h - T_c} \tag{2}$$

where W is the work input by the compressor (19), $Q_c$ is the energy extracted from the cold-side heat exchanger (23), COP is the coefficient of performance, $T_h$ is the temperature of the hot-side heat exchanger (21), $T_c$ is the temperature of the cold-side heat exchanger (23), and f is an empirical coefficient based on practical design of the system (1). In some variations, f is between about 0.4 to about 0.6. Low $T_h$–$T_c$ and high $T_c$ values typically lead to a more energy-efficient design of the heat pump (2).

In certain embodiments, the system (1) and methods of using the system (1) can be devised to ensure effective thermal coupling between the hot-side heat exchanger (21) and the desorbing sorbent module(s) (4). Hot water vapor (14) generated during desorption can be directed to the condensation chamber (16) which contains the "evaporator" or cold-side heat exchanger (23) where the vapor can be condensed into water (6). Liquid water (6) can then be collected in a water tank (25). The residual saturated and relatively cold water vapor (7b) can be recirculated back into the desorption chamber (9) to avoid excessive water loss in the environment.

In some variations, the system (1) can further include a computer (26) coupled to one or more ambient air temperature sensors (27) and/or ambient air humidity sensors (28) located outside of the desorption chamber (9) and condensation chamber (16) adapted to or configured to measure ambient air temperature and/or ambient air humidity of the environment surrounding the system (1). The computer (26) can be respectively coupled to one or more temperature sensors (29a, 29b) and/or one or more humidity sensors (30a, 30b) and/or one or more airflow sensors (31a, 31b) that can be respectively located inside the desorption chamber (9) and/or the condensation chamber (16) to measure respective desorption chamber temperature and/or humidity, and/or condensation chamber temperature and/or humidity. The temperature and/or humidity measurements based on readings from the desorption chamber and condensation chamber sensors (29a, 29b, 30a, 30b) and the environment temperature and/or humidity measurements based on readings from the ambient temperature and humidity sensors (27, 28) can be used under the control of the computer (26) implementing a water harvesting algorithm (31) to adjust operating parameters of the system (1), for example, to modify performance of the system (1) in terms of energy use, water production, and operation of the heat-pump.

Any suitable sorbent material (5) can be used in embodiments of the system (1) and methods described herein. In particular embodiments, the sorbent material (5) can include one or more metal-organic frameworks ("MOFs"). Generally, MOFs offer unique characteristics that are desirable for harvesting water (7) from air (6). See e.g., H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity ("RH"). In some variations, suitable sorbent materials (5), including MOFs, have such an isotherm step, which can be tailored to various climates. See e.g., WO2020112899. The isotherm step is typically a weak function of temperature due to hydrogen binding between the interior of the MOF pore and the water molecules. The step isotherm enables water capture and release by MOF in a very narrow range of relative humidity (about 3 to about 5% of RH).

In some variations, the MOF is: MOF-303: Al(OH) (HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4$ $(MTB)_6(HCOO)_4(H_2O)_2$; Aluminum Fumarate: Al(OH)(fumarate); MIL-160: Al(OH)(FDA), where FDA is 2,5- furandicarboxylate; MIL-53: Al(OH)(TPA), where TPA is terephthalate; or Aluminum Phosphate: AlPO4-LTA. In some variations, the MOFs have pore sizes in the range of about 0.5 nm to about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have one-dimensional channels that allow for reversible water adsorption. Any combinations of the MOFs described herein, or other MOFs, or sorbents capable of water adsorption/desorption may also be used. In some embodiments, the MOF can be mixed with a binder to improve its properties for adhesion to a substrate or support.

In other variations, other sorbents (5) having high water uptake abilities as well as the isotherm step described above may be used in the systems and methods described herein. Other suitable sorbents (5) may include, for example, certain molecular sieves (as one example, SAPO-34 a micropore zeolite, CAS No. 1318-02-1) and certain zeolites having the properties described above.

Rate of water desorption in the sorbent materials (5) (including the above-described MOFs) and saturated vapor pressure in air values increase exponentially with temperature. The specific desorption energy, on the other hand, decreases with temperature. These three factors all favor a design of the desorption process at elevated temperatures. However, higher desorption temperature incurs a higher sensible heat penalty from the sorbent material (5), water (7) inside the sorbent material (5), support structure, recirculating air (7), and water vapor. The condensation temperature needs to be below the dew point of the desorbed hot water vapor (14). More water (7) can be condensed in a single pass through the cold-side heat exchanger (23) with lower condensation temperature, but the heat-pump COP value becomes lower with increase in $T_h$–$T_c$ and decrease in $T_c$. Consequently, desorption and condensation temperatures for the water harvesting system (1) can be adjusted to achieve the lowest energy per liter of water produced with a given sorbent material (5).

Again, with primary reference to FIG. 2A, another example of the system (1) is depicted in which a rotating carousel (8a) continuously moves fully saturated MOF containing sorbent module(s) (4) into a desorption chamber (9) for desorption. Once a MOF sorbent module (4) moves into the desorption chamber (9), it is heated-up to release water (7) as hot water vapor (14). Simultaneously, the other MOF sorbent modules (4) can be exposed to humid air (6) blown across them to initiate adsorption. Upon completed desorption, a motor (32) with positioning control rotates the carousel (8a) to move the desorbed sorbent module or MOF sorbent module (4). out of the desorption chamber (9) and allowing a saturated MOF sorbent module (4) to enter the desorption chamber (9).

With reference to FIG. 2B, another example of the system (1) is depicted in which a multi-axis robotic arm (8b) (or other automated mechanism) handles switching of the MOF sorbent modules (4) between the adsorption rack (17) and the desorption chamber (9). As soon as the MOF sorbent module (4) is sufficiently desorbed in the desorption chamber (9), it can be removed by the robot arm (8b) and placed back into the adsorption rack (17). A new fully adsorbed MOF sorbent module (4) can be picked up and placed by the robotic arm (8b) into the desorption chamber (9). A computer and water harvesting algorithm (31) can be used to track desorption and adsorption status of each module.

Figure 3:
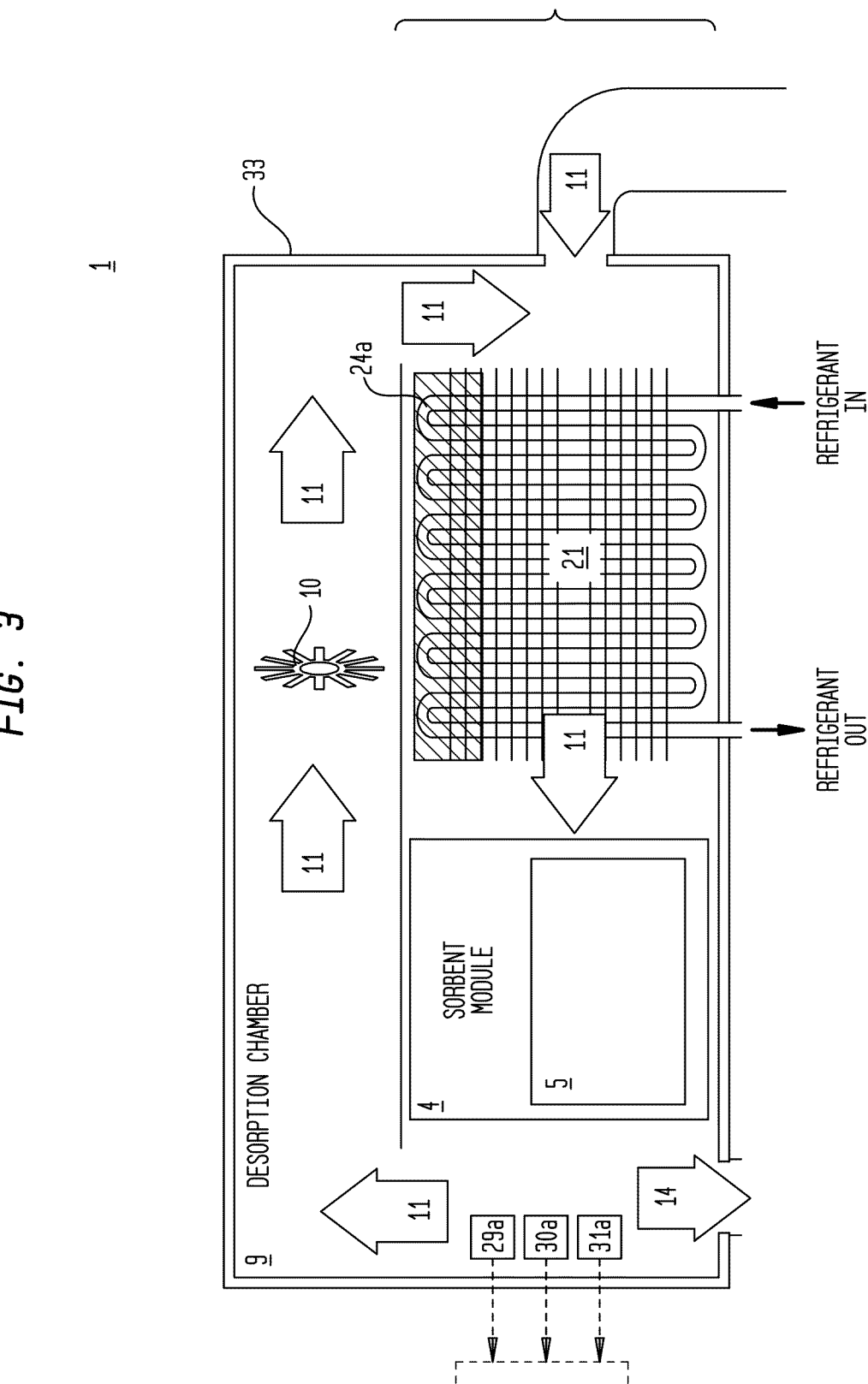
FIG. 3 depicts an exemplary schematic for thermal coupling between the "condenser" hot-side heat exchanger and the MOF module in a desorption chamber.

Now, with primary reference to FIG. 3, a schematic diagram illustrates a thermal coupling between the "condenser" hot-side heat exchanger (21) and the MOF sorbent module (4) in a desorption chamber (9). The desorption chamber (9) is thermally isolated from the environment with insulated walls (32). A recirculation fan (10) blows air (6) across the hot-side heat exchanger (21) to raise the temperature when a sufficiently adsorbed MOF sorbent module(s) (4) is placed into the desorption chamber (9). This air (6) heated by being blown across the hot-side heat exchanger (21) can then be blown across the MOF sorbent module(s) (4) to raise the temperature of the MOF sorbent module (4) to release the adsorbed water (7). A portion of the hot water vapor (14) released from the MOF sorbent module (4) can then be circulated by the recirculation fan (10) back to the hot-side main heat exchanger (21) to continue raising the at least one MOF sorbent material (5) temperature to the desired operating desorption temperature. A portion of the hot water vapor (14) from the MOF sorbent module (4) can be directed to the condensation chamber (16) for condensation. Pending on vapor conditions (RH and temperature values) at the exit of the MOF sorbent module (4), the re-circulating and desorption rates can be adjusted with variable-speed recirculation fan (10) airflow using a pre-determined algorithm (31). The goals are to achieve a constant energy load of the heat exchangers and to maintain a high moisture content of the water vapor for more efficient condensation yield. Thermal coupling between the hot-side heat exchanger (21) and the MOF sorbent module (4) can also be improved by physical contact of the heat exchanger and the MOF sorbent module (4).

It should be understood that while FIGS. 2A, 2B and 3 illustrate particular embodiments of MOF sorbent modules (4) in the system (1), other suitable sorbent modules (4) may be used in other variations of the systems (1) described herein.

Figure 4:
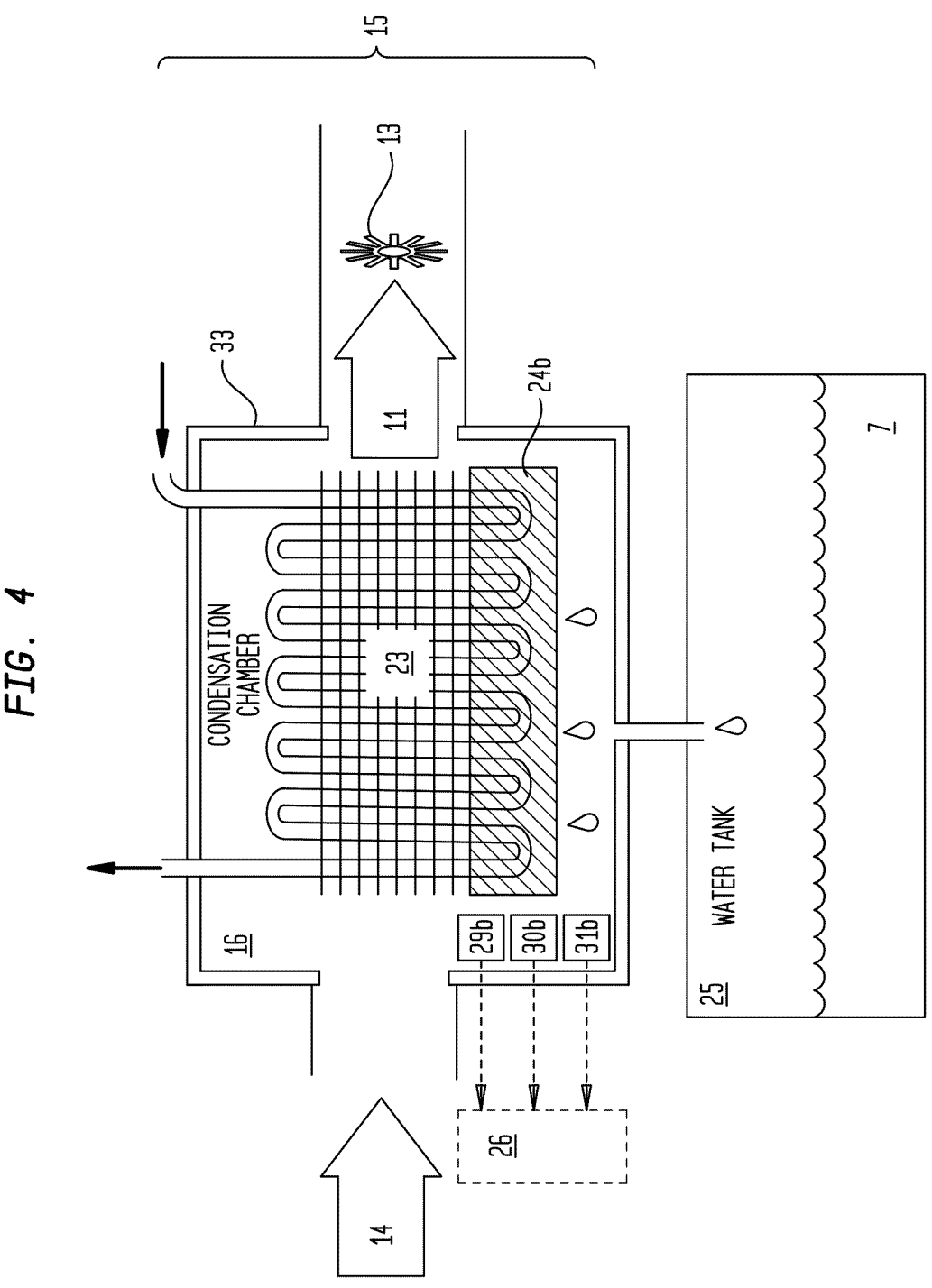
FIG. 4 depicts an exemplary schematic for water vapor condensation and liquid water collection.

Now, with primary reference to FIG. 4, which depicts an illustrative schematic for the water vapor (14) condensation and liquid water (7) collection. In such embodiment, the condensation chamber (16) can be enclosed in a thermally insulated wall (32) (or other manner of condensation chamber insulation). Hot water vapor (14) can be piped in from the desorption chamber (9) and passed through the "evaporator" cold-side heat exchanger (23) allowing the hot water vapor (14) to cool and water (7) to condense upon reaching the dew point. The exhaust carries cooler air/water mixture (11) back into the desorption chamber (9). A heat sink (24b) can be thermally coupled to the cold-side heat exchanger (23) to maintain the desired operating temperature for water condensation. Liquid water (7) can drip down from the fins of the cold-side heat exchanger (23) and can be collected in the water collection tank (25) below. A desorption-condenser recirculation fan (13) can be used to control and recirculate hot-water vapor (14) and the exhaust cooler an air/water mixture (11) between the desorption chamber (9) and condensation chamber(s) (16).

Figure 5:
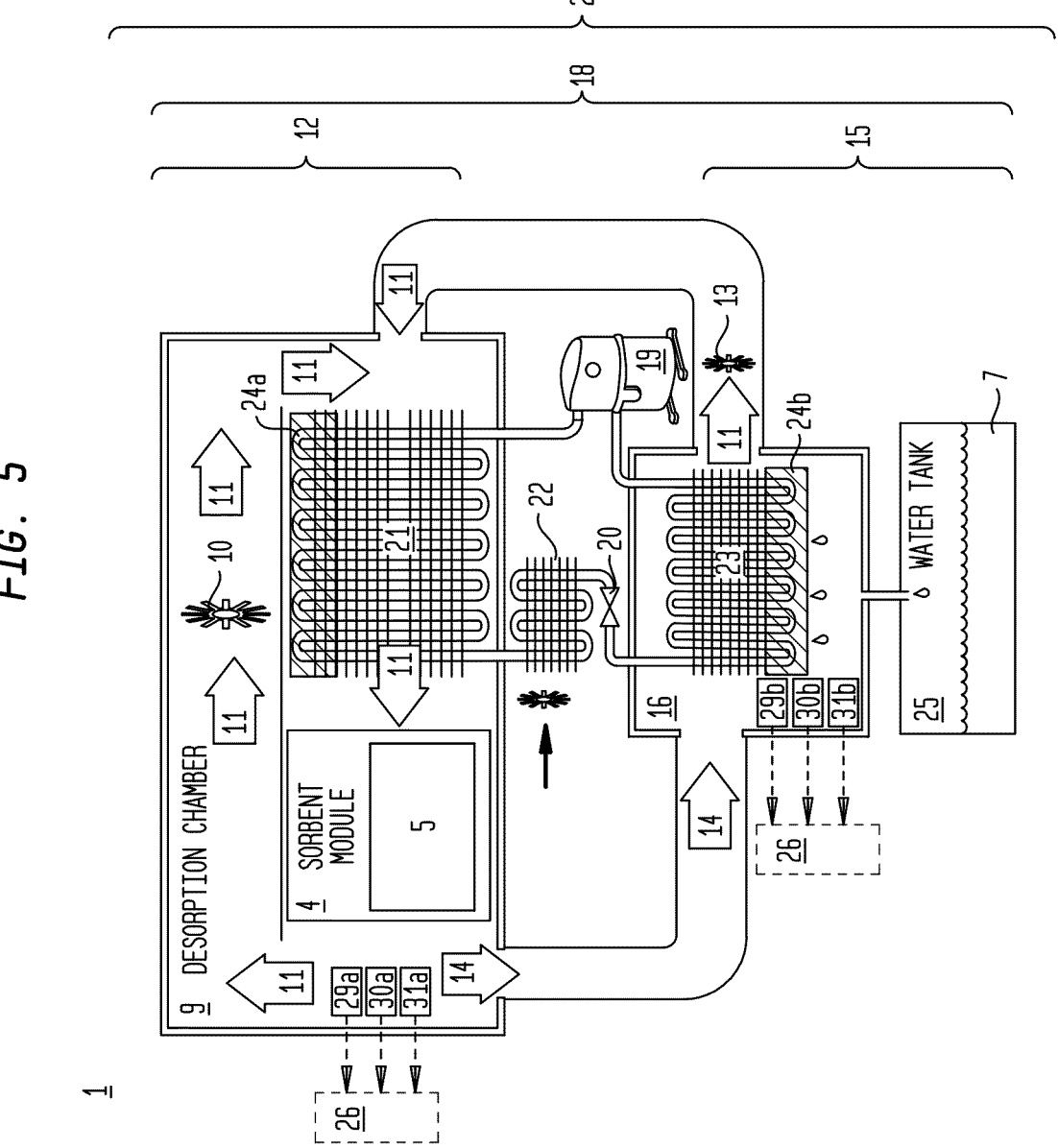
FIG. 5 depicts parts of an exemplary heat pump-based water harvesting system in which the temperature, humidity, and velocity of the circulating air values are measured.

Now, with primary reference to FIG. 5 which depicts components of an illustrative example of a particular embodiment of the system (1) where the temperature, humidity, and velocity of the circulating air values can be measured, as above described. Temperature of the hot-side heat exchanger (21) and cold-side heat exchanger (23) can also be measured. Based on these measured values, the computer (26) by execution of the water harvesting algorithm (31) can assess the energy loads for each heat exchanger (21, 22, 23). In some variations, the computer (26) in the system (1) may be programmed to adjust the air flow rates by changing the fan speed of the recirculating fans (10, 13) to maintain nearly constant energy loads for each heat exchanger (21, 22, or 23) included in the system (1) and to achieve the desired temperature for the desorption and condensation processes.

Heat pump energy balance can be obtained between the power input of the compressor, $\dot{W}$, the energy load of the cold-side heat exchanger, $\dot{Q}_c$, and the energy loads of the hot-side heat exchangers, which are denoted by $\dot{Q}_{hm}$ and $\dot{Q}_{hs}$ separately for the main and the secondary heat exchangers can be expressed as:

$$\dot{W}\left(\dot{Q}_{hm} + \dot{Q}_{hs}\right) - \dot{Q}_c \tag{3}$$

See R. Sonntag and C. V. Wylen, *Introduction to Thermodynamics Classical and Statistical*, $2^{nd}$ ed., John Wylie and Sons, 1982.

The compressor work input is constant based on the compressor design and the operating conditions. In some variations, to recycle the majority of the recovered condensation heat for desorption, the system is configured to set the following:

$$\dot{Q}_{hm} = \dot{Q}_c \tag{4}$$

and $$\dot{Q}_{hs} = \dot{W} \tag{5}$$

Thus, the energy load of the hot-side heat exchanger (21) equals to that of the cold-side heat exchanger (23). Some power input can be dissipated by the secondary hot-side heat exchanger (22) to the environment.

The hot-side heat exchanger (21) configuration may be modeled by taking into account energy "gain" due to incoming and outgoing airflow, which should be equal to the energy dissipated by the hot-side heat exchanger.

$$\dot{Q}_{hm} = \dot{m}_b C_{pb} T_b - \dot{m}_a C_{pa} T_a \tag{6}$$

where $\dot{m}_b$ is the air/water vapor mixture mass flow rate, $C_{pb}$ the specific heat capacity, and $T_b$ the temperature at location b; $\dot{m}_a$ is the air/water vapor mixture mass flow rate, $C_{pa}$ the specific heat capacity, and $T_a$ the temperature at location a. $T_b$ should be approximately equal to $T_h$, which is the operating temperature of the hot-side heat exchanger (21) with a targeted heat exchanger design. The mass flow rate can be estimated using the air density, air velocity and cross-sectional area of the heat exchanger. Initially, when the fully adsorbed sorbent module (4) (e.g., MOF sorbent module) is moved into the desorption chamber (9) for desorption, $T_a$ is low but quickly heats up during the desorption process. The system (1) increases the desorption recirculation fan speed (10) according to the equation (6) to maintain constant $\dot{Q}_{hm}$.

The energy balance for the secondary hot-side heat exchanger (22) can be expressed as follows:

$$\dot{Q}_{hs} = \dot{W} = h_s A_s (T_h - T_f) \tag{7}$$

where $h_s$ is the heat transfer coefficient of the secondary hot-side heat exchanger (22) which is a function of heat transfer geometry and air flow, $A_s$ area of the fins of the heat exchanger, and $T_f$ the environment temperature. The system (1) adjusts the rate of the airflow across the secondary hot-side heat exchanger (22) to maintain a constant energy dissipation rate as the environment temperature changes.

Both the sensible heat and the latent heat portions of the energy load at the cold-side heat exchanger need to be considered for the condensation process.

$$\dot{Q}_c = \dot{m}_d C_{pd} T_d - \dot{m}_e C_{pe} T_e + H_{fg}\left(\frac{\dot{m}_d}{\rho_d}\Phi_d - \frac{\dot{m}_e}{\rho_e}\Phi_e\right) \qquad (8)$$

where $\dot{m}_d$ is the air/water vapor mixture mass flow rate, $C_{pd}$ the specific heat capacity, $T_d$ the temperature, $\rho_d$ the air density, and $\Phi_d$ the absolute humidity at location d; $\dot{m}_e$ is the air/water vapor mixture mass flow rate, $C_{pe}$ the specific heat capacity, $T_e$ the temperature, $\rho_e$ the air density, and $\Phi_e$ the absolute humidity at location e and $H_{fg}$ is the latent heat of water at the condensation temperature. $T_e$ should be approximately equal to the cold-side heat exchanger temperature with the targeted heat exchanger design.

In some variations, the system (1) adjusts the desorption-condensation recirculation fan (13) speed to maintain a constant energy load for the cold-side heat exchanger (23) as temperature and humidity values of the incoming and outcoming air/water vapor mixture changes.

Again, with primary reference to FIG. 5, a method of using a particular embodiment of the invention can comprise one or more of: drawing surrounding air (6) into at least one sorbent module (4) positioned in an adsorption unit (3), wherein at least one sorbent module (4) adsorbs water (7) from the surrounding air (6); once the at least one sorbent module (4) is saturated to a target level of water (7) and/or rate of adsorption, transferring the at least one sorbent module (4) from the adsorption unit (3) to a desorption chamber (9) using a transfer mechanism (8, 8a, 8b); moving an air/water mixture (11) across a hot side (12) of a heat pump (2) through at least one sorbent module (4) positioned in the desorption chamber (9) to facilitate water desorption; optionally repeating the method until the at least one sorbent module (4) in the desorption chamber (9) is depleted of adsorbed water; and transferring the at least one sorbent module in the desorption chamber after desorption to the adsorption unit using the transfer mechanism.

In particular embodiments, the method can further comprise performing the method at an average desorption temperature and the average condensation temperature for the system to (i) achieve the lowest energy per liter of water produced with the one or more sorbents, and (ii) maintain a desorption temperature high enough to sustain a target rate of desorption.

In particular embodiments the method can further comprise one or more of: transferring hot water vapor (14) from the desorption chamber (9) to a cold side (15) of the heat pump (2); condensing water from said hot water vapor; and collecting water condensed from said hot water vapor.

EXAMPLES

The presently disclosed subject matter will be better understood by reference to the following Examples, which are provided as illustrative examples of embodiments of the invention, and not by way of limitation.

Example 1

Desorption and Condensation Temperatures

The example describes desorption and condensation temperatures used in a water harvesting system (1). The model used an iterative procedure. First, the model set the initial desorption and condensation temperatures of the system (1). Based on the isotherm step of the sorbent, the absolute humidity in the desorption chamber was known at the given desorption temperature. The condensation yield can be calculated for the given condensation temperature, if the relative humidity and temperature of the water vapor in the desorption chamber is known. The efficiency of the heat pump (2) can be computed with Equation 2 assuming f=0.6 and in turn the work input is calculated using Equation 1. In addition to the desorption and condensation energy, the model further considered the sensible heat value required to heat up the sorbent, water inside sorbent, air, and vapor. The model also took into account the temperature of the recycled water vapor (11) and the specified total water harvesting yield of the system. Thus, the system energy consumption per liter of harvested water (7) was approximated as a function of the desorption and condensation temperatures with a given MOF sorbent material (5). Operating conditions can be obtained by varying the two variables (desorption and condensation temperatures). See Table 1 below.

TABLE 1

| MOF Type | Isotherm step @25° C. (RH %) | Desorption Temperature (° C.) | Condensation Temperature (° C.) |
|---|---|---|---|
| Arid | 20 | 136 | 90 |
| Moderate | 40 | 117 | 91 |
| Humid | 60 | 107 | 92 |

Table 1 shows the desorption and condensation temperatures for three types of MOF sorbent materials (5). The water harvester which contains an Arid-type MOF with an isotherm step of 20% of relative humidity (RH) at 25° C. can operate at the desorption temperature of about 136° C. and the condensation temperature of about 90° C. Moderate MOF with an isotherm step of RH 40% requires desorption and condensation temperatures of about 117° C. and about 91° C., respectively; while a Humid MOF with an isotherm step of RH 60% requires desorption and condensation temperatures at about 107° C. and about 92° C., respectively.

Table 1 indicates that utilization of a high-temperature heat pump (2) may be required to achieve the lowest energy consumption per liter of harvester water (7) given that the high-temperature heat pump operates at about 90° C. to about 160° C. for the hot-side heat exchanger (21) and about 40° C. to about 95° C. for the cold-side heat exchanger (23).

As can be easily understood from the foregoing, the basic concepts of the present invention may be embodied in a variety of ways. The invention involves numerous and varied embodiments of a water harvesting system (1) and methods for making and using such water harvesting system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "water harvester" should be understood to encompass disclosure of the act of "water harvesting"—whether explicitly discussed or not—and, conversely, were there is a disclosure of the act of "water harvesting", such a disclosure should be understood to encompass disclosure of a "water harvester" and even a "means for water harvesting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A water harvester, comprising:
a rotary device containing a sorbent, including:
at least one process sector,
said at least one process sector including a process air inlet and a process air outlet,
wherein process air flows from said process air inlet to said process air outlet through said at least one process sector,
wherein a sorbent in said at least one process sector adsorbs water from said process air flowing through said at least one process sector,
at least one reactivation sector,
said at least one reactivation sector including a reactivation air inlet and a reactivation air outlet,
wherein reactivation air flows from said reactivation air inlet to said reactivation air outlet through said at least one reactivation sector,
wherein said sorbent in said reactivation sector desorbs water into said reactivation air flowing through said at least one reactivation sector,
a drive assembly configured to rotate said rotary device;
a heat pump, comprising:
a compressor;
an expansion valve;
an evaporator;
a condenser;
a refrigerant fluid which flows sequentially within said compressor, said condenser, said expansion valve, and said evaporator,
wherein said condenser receives said reactivation air prior to flowing said reactivation air through said at least one reactivation sector,
wherein said evaporator receives said reactivation air from said at least one reactivation sector; and
a controller configured to receive one or more input parameters including one or more of: ambient temperature, ambient humidity, reactivation air temperature, reactivation air humidity,
wherein said controller implementing a water harvesting algorithm based on said one or more input parameters controls operation of said rotary device and said heat pump.

2. The water harvester of claim 1, wherein said condenser of said heat pump sufficiently heats said reactivation air to desorb water from said sorbent material in said at least one reactivation sector.

3. The water harvester of claim 2, wherein said evaporator of said heat pump sufficiently cools said reactivation air received from said reactivation sector to condense water from said reactivation air.

4. The water harvester of claim 1, wherein said rotary device comprises a carousel containing said sorbent, said carousel rotated by said drive assembly to sequentially dispose said sorbent in said at least one process sector or in said at least one reactivation sector.

5. The water harvester of claim 1, wherein said sorbent comprises one or more sorbents capable of adsorbing water from said process air.

6. The water harvester of claim 5, wherein said sorbent comprises one or more of: a metal organic framework, a zeolite, an alumina, a terephthalate, an isophthalate, or combinations thereof.

7. The water harvester of claim 5, wherein said sorbent comprises one or more of: MOF-303: $Al(OH)(HPDC)$, wherein HPDC is 1H-pyrazole-3,5-dicarboxylate; CAU-10: $Al(OH)(IPA)$, wherein IPA comprises isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: $Al(OH)(fumarate)$; MIL-160: $Al(OH)(FDA)$, wherein FDA is 2,5-furandicarboxylate; MIL-53: $Al(OH)(TPA)$, where TPA is terephthalate; and Aluminum Phosphate: saAlPO4-LTA.SAPO-34, or combinations thereof.

8. The water harvester of claim 1, wherein said sorbent adhered to a substrate within said rotary device.

9. The water harvester of claim 1, further comprising a water tank disposed to receive water condensed from said reactivation air.

10. The water harvester of claim 3, wherein a portion of said reactivation air cooled by said evaporator of said heat pump supplied to a closed space as conditioned air.

11. The water harvester of claim 1, further comprising one or more fans adapted to generate a flow of said process air through said at least one process sector or said reactivation air through said at least one reactivation sector.

12. The water harvester of claim 1, wherein said controller controls said compressor based on the input parameters to achieve a pre-selected liters/day of water.

13. The water harvester of claim 1, wherein said controller controls said compressor based on the input parameters to achieve the lowest energy per liter of water.

14. The water harvester of claim 1, wherein said heat pump unit comprises an auxiliary condenser, wherein said refrigerant fluid flows sequentially to said condenser, then said auxiliary condenser, said expansion valve, said evaporator, and back to said compressor.

15. The water harvester of claim 1, wherein said controller can access energy loads for said condenser, said auxiliary condenser and said evaporator, wherein said controller operates to maintain a nearly constant energy load for each of said condenser, said auxiliary condenser and said evaporator to achieve desorption of water into said reactivation air flowing through said at least one reactivation sector and condense water from said reactivation air.

* * * * *